(12) United States Patent
Tanaka

(10) Patent No.: US 8,283,819 B2
(45) Date of Patent: Oct. 9, 2012

(54) VOLTAGE ADJUSTER FOR AC GENERATOR FOR VEHICLE

(75) Inventor: Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 406 days.

(21) Appl. No.: 12/582,204

(22) Filed: Oct. 20, 2009

(65) Prior Publication Data

US 2010/0302738 A1 Dec. 2, 2010

(30) Foreign Application Priority Data

May 26, 2009 (JP) .................................. 2009-126449

(51) Int. Cl.
*H02K 7/00* (2006.01)
(52) U.S. Cl. ........................................ 310/68 D; 310/64
(58) Field of Classification Search .................... 310/68, 310/64 D, 68 D, 64; 361/704
See application file for complete search history.

(56) References Cited

U.S. PATENT DOCUMENTS

| 6,839,236 B2* | 1/2005 | Yamamoto et al. | 361/704 |
| 6,936,941 B2* | 8/2005 | Oohashi et al. | 310/68 D |
| 2007/0290557 A1 | 12/2007 | Ito | |

FOREIGN PATENT DOCUMENTS

| JP | 2003-244913 A | 8/2003 |
| JP | 2004-293830 A | 10/2004 |
| JP | 2006-258354 A | 9/2006 |
| JP | 2007-336695 A | 12/2007 |
| JP | 2008-005676 A | 1/2008 |
| JP | 2008-295115 A | 12/2008 |
| JP | 2009-008056 A | 4/2009 |

* cited by examiner

*Primary Examiner* — Dang Le
(74) *Attorney, Agent, or Firm* — Sughrue Mion, PLLC

(57) ABSTRACT

In a voltage adjuster for a vehicle AC generator which has a cooing member for cooling a circuit portion of the voltage adjuster and in which plural fins of the cooling member are disposed so as to face an air suction hole formed in a case, the cooling member is constructed by assembling a first cooling plate having the same cross-sectional surface in a generating and processing direction and at least a second cooling plate having the same cross-sectional surface in a generating and processing direction and the same cross-sectional surface shape as the first cooling plate, and the fin end surfaces of one cooling plate are abutted on the other cooling plate so as to face the ventilation paths formed by the plural fins of the other cooling plate.

8 Claims, 4 Drawing Sheets

VOLTAGE ADJUSTER FOR AC GENERATOR FOR VEHICLE

BACKGROUND OF THE INVENTION

1. Field of the Invention

The present invention relates to a voltage adjuster for an AC (alternating-current) generator for a vehicle that is mounted in a vehicle or the like and controls an output voltage, and particularly to a cooling structure of the voltage adjuster.

2. Description of the Related Art

There is known a conventional voltage adjuster for use in an AC generator for a vehicle in which cooling air is made to flow through a ventilation path between cooling fins of a heat sink for the voltage adjuster over the whole length in the radial direction to efficiently absorb heat generation under use, thereby suppressing deterioration of cooling performance (see JP-A-2007-336695, pp 3-4, FIGS. 6 and 7, for example). A cooling plate having plural cooling fins extending in parallel can be obtained at low cost by extruding or drawing aluminum material or the like so as to form the cooling fins in the same sectional shape.

There is also known another conventional voltage adjuster in which a blind alley type ventilation path is discontinuously formed in a ventilation direction by a thin-walled aluminum plate, that is, a base portion adhesively fixed to a control circuit portion and a heat radiation portion having a substantially U-shaped transverse section in the ventilation direction, so that blocking caused by foreign materials pinched in a continuous ventilation path can be suppressed (see JP-A-2003-244913, pp 2-5, FIGS. 3 and 5, for example).

In the construction using the conventional cooling plate disclosed in JP-A-336695, sufficient cooling air flows through the ventilation path between the heat sink fins, however, only the longitudinal side surfaces of the fins are used, that is, it is not sure that how degree the end surfaces of the fins (the cut surfaces of the fins in the extrusion process) contribute to cooling.

Furthermore, in the other example in which the ventilation path is discontinuously formed in the ventilation direction disclosed in JP-A-2003-244913, the side surfaces of individual heat radiation portions as the end surfaces of the fins are exposed in the ventilation direction, however, the heat-radiation effect thereof is based on the small thickness. Furthermore, in order to obtain this construction, a thin-walled aluminum plate different from a heat sink is required to be subjected to press molding, and thus there is a problem that addition and change of the facilities, steps, etc. of the press molding are indispensable.

SUMMARY OF THE INVENTION

The present invention has been implemented in view of the foregoing problem, and has an object to provide a voltage adjuster for an AC generator for a vehicle that can surely enhance a cooling efficiency at low costs with suppressing the investment of new facilities and change of the shapes to the lower limit level.

In order to attain the above object, according to a first aspect of the present invention, an AC generator for a vehicle includes: a case having an air suction hole formed therein; a shaft supported in the case so as to be freely rotatable; a rotor that is mounted in the case and has a pole core fixed to the shaft, a field winding mounted on the pole core, and a cooling fan fixed to at least one end in an axial direction of the pole core; a stator fixed to the case so as to surround the rotor; a rectifying device for rectifying AC electromotive force generated in the stator to DC; a voltage adjuster for adjusting the magnitude of an AC voltage generated in the stator; and a cooling member that is brought into contact with a circuit portion of the voltage adjuster to cool the circuit portion and has a base portion and plural fins projecting from the base portion in one direction so as to face the air suction hole formed in the case. The cooling member includes an assembly of a first cooling plate having the same cross-sectional surface in a generating and processing direction and at least a second cooling plate that has the same cross-sectional surface in a generating and processing direction and has the same cross-sectional surface shape as the first cooling plate, and the first cooling plate and the second cooling plate are abutted on each other so that the fin end surfaces of one cooling plate face ventilation paths formed by plural fins of the other cooling plate.

According to a second aspect of the present invention, an AC generator for a vehicle includes: a case; a shaft supported in the case so as to be freely rotatable; a rotor that is mounted in the case and has a pole core fixed to the shaft, a field winding mounted on the pole core, and a cooling fan fixed to at least one end in an axial direction of the pole core; a stator fixed to the case so as to surround the rotor; a rectifying device for rectifying AC electromotive force generated in the stator to DC; a voltage adjuster for adjusting the magnitude of an AC voltage generated in the stator; a cover that protects at least an axial end of the voltage adjuster and has an air suction hole formed therein; and a cooling member that is brought into contact with a circuit portion of the voltage adjuster to cool the circuit portion and has a base portion and plural fins projecting from the base portion in one direction so as to face the air suction hole formed in the cover. The cooling member comprises an assembly of a first cooling plate having the same cross-sectional surface in a generating and processing direction and at least a second cooling plate that has the same cross-sectional surface in a generating and processing direction and has the same cross-sectional surface shape as the first cooling plate, and the first cooling plate and the second cooling plate are abutted on each other so that the fin end surfaces of one cooling plate face ventilation paths formed by plural fins of the other cooling plate.

According to the voltage adjuster for the vehicle AC generator of this invention, the cooling efficiency of the voltage adjuster can be surely enhanced at low cost with suppressing the investment of new facilities and change of the shapes to the lower limit level.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Preferred embodiments according to the present invention will be described with reference to the accompanying drawings. In each drawing, same numerals indicate same or corresponding part.

First Embodiment

Figure 1:
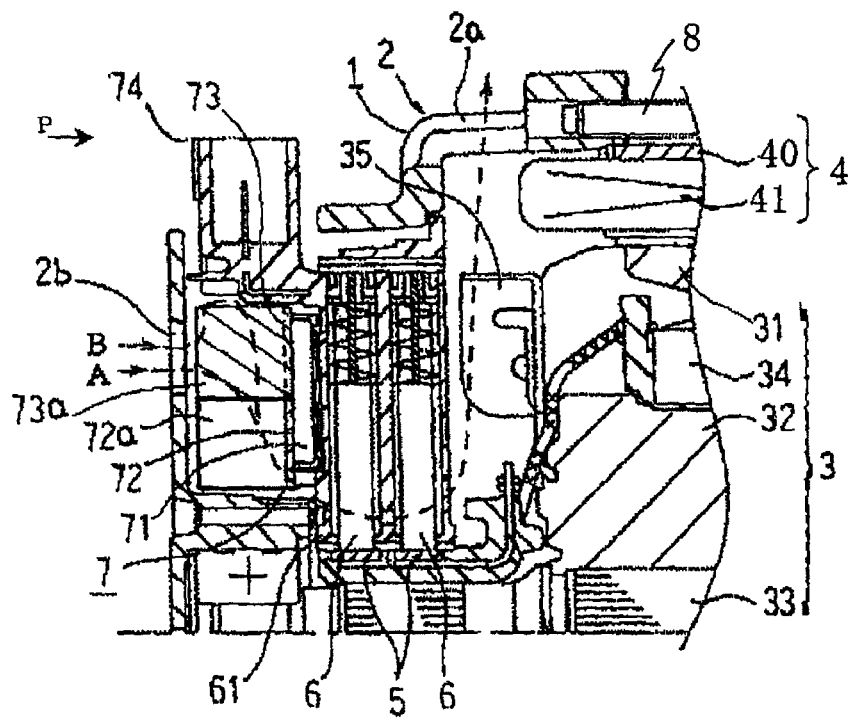
FIG. 1 is a cross-sectional view showing a main part of an AC generator for a vehicle according to a first embodiment of the present invention.
Figure 2:
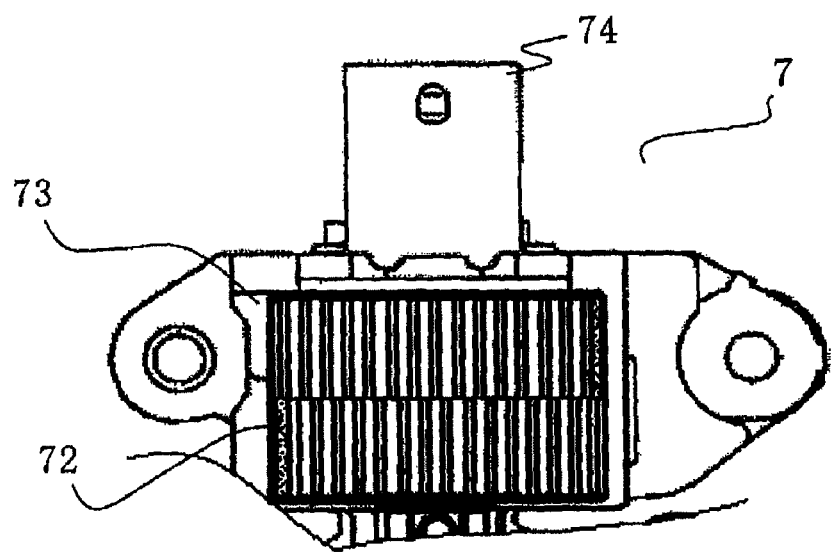
FIG. 2 is a plan view showing a voltage adjuster of FIG. 1 which is viewed in a direction indicated by an arrow P.
Figure 3:
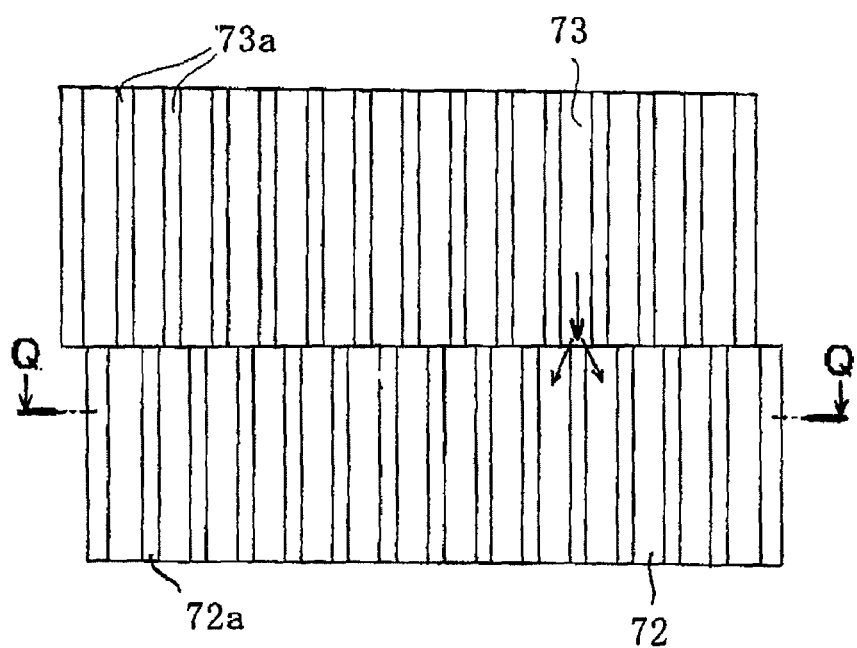
FIG. 3 is a plan view showing a cooling plate according to the first embodiment of the present invention before the cooling plate is incorporated into the voltage adjuster.
Figure 4:
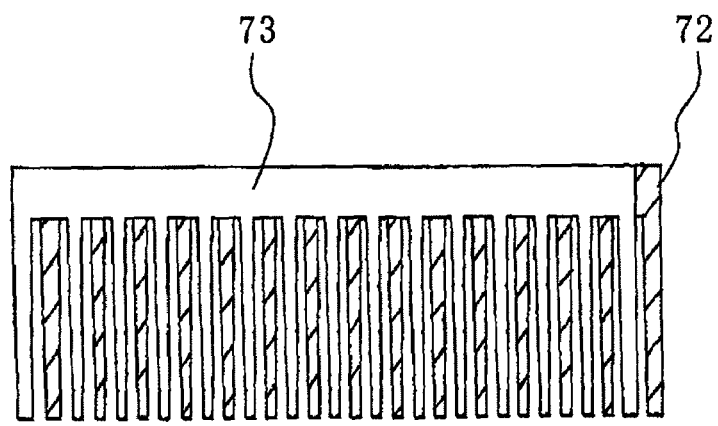
FIG. 4 is a cross-sectional view taken along Q-Q line of FIG. 3.
Figure 5:
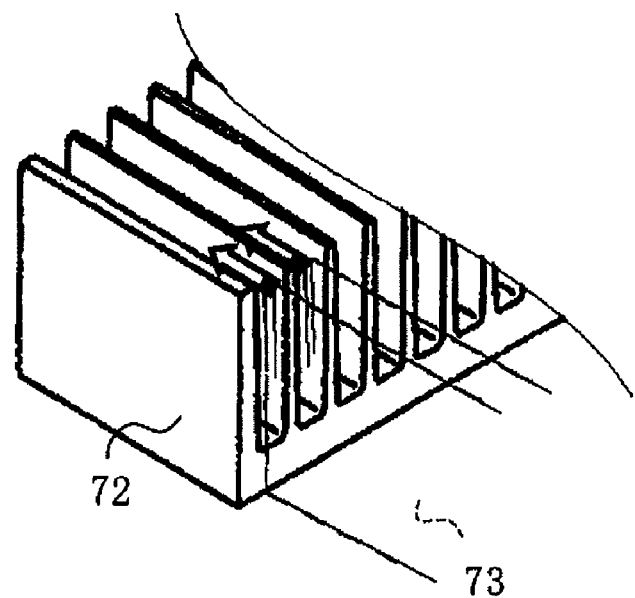
FIG. 5 is a perspective view containing a partially perspective view to explain an introducing state of cooling air flow at a fin abutting end surface according to the first embodiment.

FIG. 1 is a cross-sectional view showing a main part of an AC generator for a vehicle according to a first embodiment, FIG. 2 is a plan view of a voltage adjuster of FIG. 1 when viewed from P, FIG. 3 is a plan view of a cooling plate according to the first embodiment before the cooling plate is installed to the voltage adjuster, FIG. 4 is a cross-sectional view taken along Q-Q line of FIG. 3, and FIG. 5 is a perspective view containing a partially perspective view showing a cooling air flow introducing state at the abutting end surfaces of fins.

First, the overall structure of an AC generator for a vehicle (hereinafter referred to as "vehicle AC generator") will be described with reference to the figures.

In FIGS. 1 and 2, the vehicle AC generator 1 has a case 2 comprising a front bracket (not shown) and a rear bracket which are formed of aluminum and designed to be substantially bowl-shaped respectively, a shaft 33 supported in the case 2 so as to be freely rotatable, a rotor 3 which is fixed to the shaft 33 and freely rotatably disposed in the case 2, a centrifugal fan 35 fixed to the end surface in the axial direction of the rotor 3, a stator 4 held in the case 2 so as to surround the rotor 3, a pair of slip rings 5 which are fixed to the rear side end portion of the shaft 33 and supply field current to the rotor 3, a brush 6, a rectifying device (not shown) which is electrically connected to the stator 4 and rectifies alternating current generated in the stator 4 to direct current, a voltage adjuster 7 for adjusting the magnitude of an AC voltage generated in the stator 4, and a connector unit 74 to which an external plug (not shown) is mounted and which inputs, from the external, field current to be supplied through the brush 6 and the slip rings 5 to a rotor coil 34.

The rotor 3 comprises the rotor coil 34 in which field current flows to generate a magnetic flux, and pole cores 31 and 32 which are provided so as to cover the rotor coil 34 and forms a magnetic pole by the magnetic flux of the rotor coil 34. The stator 4 comprises a stator iron core 40, and a stator coil 41 which is wound around the stator iron core 40 and in which alternating current occurs due to variation of the magnetic flux from the rotor coil 34 in connection with the rotation of the rotor 3. The stator 4 is disposed so as to surround the rotor 3, and secured to the front bracket (not shown) and the rear bracket fastened to each other by a fastening bolt 8 while the outer peripheral edge portion of the end surface in the axial direction of the stator iron core 40 is pinched under pressure.

Next, the voltage adjuster 7 will be described in detail.

A circuit portion 71 of the voltage adjuster 7 is disposed in proximity to a brush mount unit 61 in which the brush 6 is mounted, and a cooling member for cooling the circuit portion 71 is mounted on the back surface of the circuit portion 71.

The cooling member for cooling the circuit portion 71 comprises a combination of a first cooling plate 72 having plural cooling fins 72a which are provided on a base board so as to project from the base board in one direction, and a second cooling plate 73 having plural cooling fins 73a which are provided on a base board so as to project from the base board in one direction as in the case of the first cooling plate 72. The cooling plates 72 and 73 are formed so that the cross-sections of the fins in an extruding or drawing direction in an extrusion or drawing process are identical to each other and the cross-sections of the cooling plates are also identical to each other.

That is, as shown in FIGS. 2 to 5, the first cooling plate 72 and the second cooling plate 73 are constructed so that the plural cooling fins 72a and the plural cooling fins 73a which extend in parallel and form ventilation paths are assembled into one body (abut on each other) so as to be out of alignment (i.e., the columns of the cooling plates 72 and 73 are displaced in a direction perpendicular to the cooling air flow direction). Accordingly, the fin end surfaces (cut surfaces) at the abutting sites of each of the first and second cooling plates 72 and 73 face the ventilation paths of the other cooling plate and thus faces the cooling air flow.

In the thus-constructed voltage adjuster of the vehicle AC generator according to the first embodiment, the difference in operation from the conventional vehicle AC generator resides in flow of cooling air which is sucked from an air suction hole 2b provided to the case 2 facing the cooling fins 72a and 73a and discharged from an exhaust hole 2a.

The air suction hole 2b is disposed so as not to be overlapped with the abutting sites of the cooling fins 72a and 73a in the axial direction, and both flow A and flow B as examples of the flow of the cooling air are sucked through the air suction hole 2b, abuts against the cooling fin end surfaces and then flow.

As indicated by an arrow of FIG. 3, the air flow which impinges against the cooling fin end surface is split into right-hand and left-hand air flows as indicated by arrows in FIG. 3 and then each split air flow flows into the gap between the other abutted cooling fins. As described above, the flow of cooling air flowing along the respective ventilation paths defined by the side surfaces of the adjacent cooling fins 73a surely cools the overall side surfaces of the cooling fins 72a, and thus the cooling efficiency can be more enhanced as compared with the related art.

Each of the first cooling plate 72 and the second cooling plate 73 constituting the cooling member is formed by executing integral molding on an aluminum member to form the base board and the fins integrally with each other, and the first and second cooling plates 72 and 73 which are formed by the integral molding so as to have the same cross-sectional shape abut on each other. Therefore, as compared with a case where the cooling member is constructed by one aluminum member, it can be obtained only by changing the setting of the cut length in the extrusion process, and thus the performance can be enhanced without excessively increasing the cost.

In the first embodiment described above, the cooling member is constructed by the two same cooling plates. However, the number of the cooling plates is not limited to two, and the optimum number and arrangement of cooling plates may be considered by properly selecting the length and pitch of the ventilation paths or the like.

The cooling fins are not required to be arranged at the same pitch, and the arrangement pitch of the cooling fins may be freely selected within a range in which the same cross-sectional shape can be formed in the extrusion process at least insofar as the cut end surfaces of the fins of one cooling plate are not overlapped with the cut end surfaces of the fins of the other cooling plate at the respective abutting sites. For example, the cross-sections of the fins are shaped linearly, however, they may be shaped to be wavelike or irregular (i.e., uneven).

Second Embodiment

Figure 6:
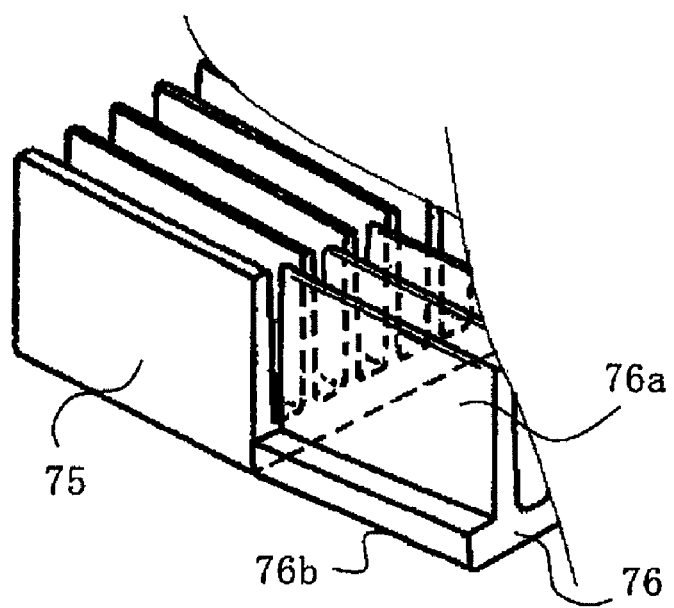
FIG. 6 is a perspective view showing the structure of a cooling plate according to a second embodiment of the present invention.

FIG. 6 is a perspective view showing a cooling plate according to a second embodiment.

The second embodiment is different from the first embodiment in that no cooling fin is provided at one end of each of cooling plates 75 and 76 as shown in FIG. 6 although the plural cooling fins of each cooling plate are provided so as to extend in parallel from one end to the other end in the first embodiment.

According to the above construction, when the first cooling plate 75 and the second cooling plate 76 abut on each other, a cooling-plate projecting portion 76b corresponding to one end portion of one cooling plate 76 can be located at the same position as one end of the other cooling plate 75, and thus both the cooling plates 75 and 76 can be easily positioned. Accordingly, when the cooling plates 75 and 76 are assembled into one body, it is unnecessary to use a jig for keeping the fin displacement state between both the cooling plates 75 and 76, and thus the workability can be enhanced. In this case, the cooling plates 75 and 76 can be provided so as to have the same cross-sectional shape (the other end of the cooling plate 76 is located at the same position as a cooling-plate projecting portion 75b corresponding to the end portion of the cooling plate 75), and thus the number of parts is not increased.

In both the embodiments, the elements from the stator 4 to the voltage adjuster 7, the rotor 3 are surrounded in a bowl-shape by the case 2. However, this invention is applicable to a construction that the voltage adjuster 7 is supported on the back surface of a member which is shaped so as to support the stator 4 and the rotor 3. In this case, the case 2 may be replaced by a cover which is provided at the shaft end portion and covers the cooling fins of the cooling plate of the voltage adjuster or the like.

Third Embodiment

Figure 7:
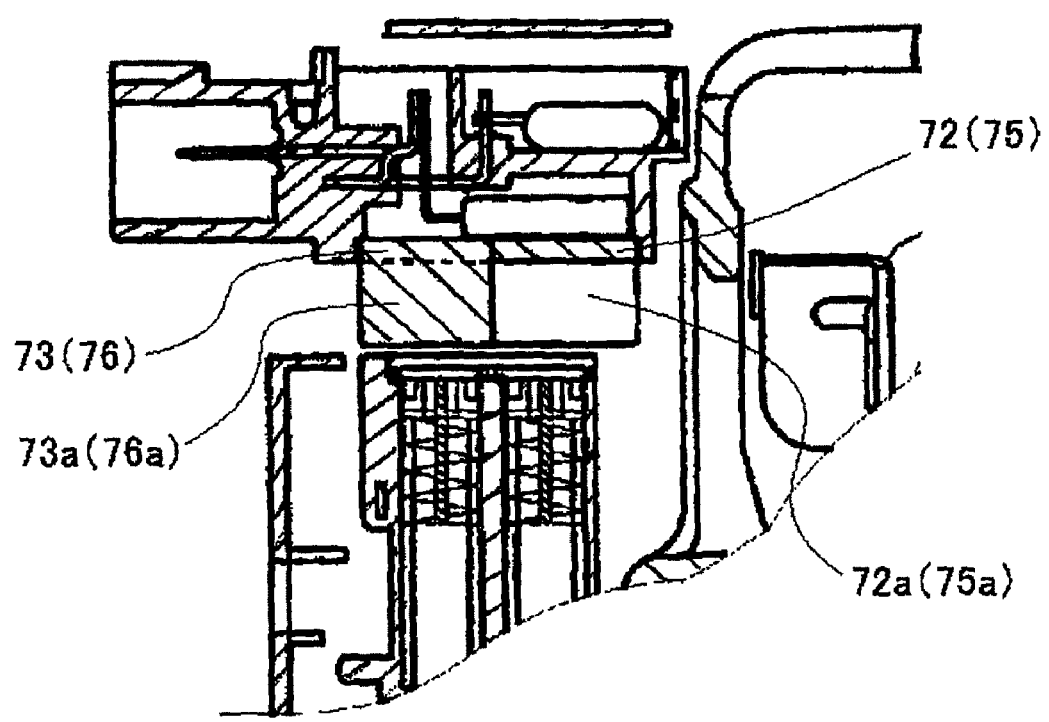
FIG. 7 is a cross-sectional view showing a main part of an AC generator for a vehicle according to a third embodiment of the present invention.

FIG. 7 is a cross-sectional view of a main part of a vehicle AC generator according to a third embodiment of the present invention.

In the first and second embodiments, the projecting tips of the cooling fins of the cooling plates 72 (75) and 73 (76) as the cooling member face the air suction hole provided in the case, the cover or the like. The flow of cooling air which is sucked from the tip side of the cooling fins 72a (73a) and flows into the ventilation paths between the fins arranged substantially in the radial direction is generated by the cooling fan.

On the other hand, the third embodiment is different from the first and second embodiments in that the cooling fin end surfaces (cut surfaces) of the cooling plates 72 (75), 73 (76) as the cooling member face the air suction hole provided in the case, the cover or the like.

In an example of FIG. 7, the cooling plates 72 (75), 73 (76) as the cooling member are likewise mounted on the back surface of the circuit portion of the voltage adjuster disposed at the external diameter side of the brush mount unit. The plural cooling fins 72a (75a), 73a (76a) are projected toward the center of the axis substantially in the radial direction, and cooling air in the axial direction traverses the ventilation paths between the respective fins. The other detailed constructions of the cooling member are the same as the first and second embodiment.

According to the above construction, the cooling performance having the same level as the first and second embodiments can be performed by the third embodiment.

Various modifications and alterations of this invention will be apparent to those skilled in the art without departing from the scope and spirit of this invention, and it should be understood that this is not limited to the illustrative embodiments set forth herein.

What is claimed is:

1. An AC generator for a vehicle comprising:
    a case having an air suction hole formed therein;
    a shaft supported in the case so as to be freely rotatable;
    a rotor that is mounted in the case and has a pole core fixed to the shaft, a field winding mounted on the pole core, and a cooling fan fixed to at least one end in an axial direction of the pole core;
    a stator fixed to the case so as to surround the rotor;
    a rectifying device for rectifying AC electromotive force generated in the stator to DC;
    a voltage adjuster for adjusting the magnitude of an AC voltage generated in the stator; and
    a cooling member that is brought into contact with a circuit portion of the voltage adjuster to cool the circuit portion and has a base portion and plural fins projecting from the base portion in one direction so as to face the air suction hole formed in the case, wherein the cooling member comprises an assembly of a first cooling plate having the same cross-sectional surface in a generating and processing direction and at least a second cooling plate that has the same cross-sectional surface in a generating and processing direction and has the same cross-sectional surface shape as the first cooling plate, and the first cooling plate and the second cooling plate are abutted on each other so that the fin end surfaces of one cooling plate face ventilation paths formed by plural fins of the other cooling plate, wherein an opening end face of the air suction hole of the case is not overlapped with the abutting site between the first cooling plate and the second cooling plate of the cooing member in the axial direction.

2. The AC generator according to claim 1, wherein the cooling plate constituting the cooling member is formed by integrally molding the base portion and the fins with an aluminum member.

3. An AC generator for a vehicle comprising:
    a case having an air suction hole formed therein;
    a shaft supported in the case so as to be freely rotatable;
    a rotor that is mounted in the case and has a pole core fixed to the shaft, a field winding mounted on the pole core, and a cooling fan fixed to at least one end in an axial direction of the pole core;
    a stator fixed to the case so as to surround the rotor;
    a rectifying device for rectifying AC electromotive force generated in the stator to DC;
    a voltage adjuster for adjusting the magnitude of an AC voltage generated in the stator; and
    a cooling member that is brought into contact with a circuit portion of the voltage adjuster to cool the circuit portion and has a base portion and plural fins projecting from the base portion in one direction so as to face the air suction hole formed in the case, wherein the cooling member comprises an assembly of a first cooling plate having the same cross-sectional surface in a generating and processing direction and at least a second cooling plate that has the same cross-sectional surface in a generating and processing direction and has the same cross-sectional surface shape as the first cooling plate, and the first cooling plate and the second cooling plate are abutted on each other so that the fin end surfaces of one cooling plate face ventilation paths formed by plural fins of the other cooling plate, wherein a positioning unit for positioning one cooling plate and the other cooling plate is provided to a fin side surface of at least the one cooling plate of the cooling member.

4. The AC generator according to claim 3, wherein the cooling plate constituting the cooling member is formed by integrally molding the base portion and the fins with an aluminum member.

5. An AC generator for a vehicle comprising:
a case;
a shaft supported in the case so as to be freely rotatable;
a rotor that is mounted in the case and has a pole core fixed to the shaft, a field winding mounted on the pole core, and a cooling fan fixed to at least one end in an axial direction of the pole core;
a stator fixed to the case so as to surround the rotor;
a rectifying device for rectifying AC electromotive force generated in the stator to DC;
a voltage adjuster for adjusting the magnitude of an AC voltage generated in the stator;
a cover that protects at least an axial end of the voltage adjuster and has an air suction hole formed therein; and
a cooling member that is brought into contact with a circuit portion of the voltage adjuster to cool the circuit portion and has a base portion and plural fins projecting from the base portion in one direction so as to face the air suction hole formed in the cover,
wherein the cooling member comprises an assembly of a first cooling plate having the same cross-sectional surface in a generating and processing direction and at least a second cooling plate that has the same cross-sectional surface in a generating and processing direction and has the same cross-sectional surface shape as the first cooling plate, and the first cooling plate and the second cooling plate are abutted on each other so that the fin end surfaces of one cooling plate face ventilation paths formed by plural fins of the other cooling plate, wherein an opening end face of the air suction hole of the cover is not overlapped with the abutting site between the first cooling plate and the second cooling plate of the cooing member in the axial direction.

6. The AC generator according to claim 5, wherein the cooling plate constituting the cooling member is formed by integrally molding the base portion and the fins with an aluminum member.

7. An AC generator for a vehicle comprising:
a case;
a shaft supported in the case so as to be freely rotatable;
a rotor that is mounted in the case and has a pole core fixed to the shaft, a field winding mounted on the pole core, and a cooling fan fixed to at least one end in an axial direction of the pole core;
a stator fixed to the case so as to surround the rotor;
a rectifying device for rectifying AC electromotive force generated in the stator to DC;
a voltage adjuster for adjusting the magnitude of an AC voltage generated in the stator;
a cover that protects at least an axial end of the voltage adjuster and has an air suction hole formed therein; and
a cooling member that is brought into contact with a circuit portion of the voltage adjuster to cool the circuit portion and has a base portion and plural fins projecting from the base portion in one direction so as to face the air suction hole formed in the cover,
wherein the cooling member comprises an assembly of a first cooling plate having the same cross-sectional surface in a generating and processing direction and at least a second cooling plate that has the same cross-sectional surface in a generating and processing direction and has the same cross-sectional surface shape as the first cooling plate, and the first cooling plate and the second cooling plate are abutted on each other so that the fin end surfaces of one cooling plate face ventilation paths formed by plural fins of the other cooling plate, wherein a positioning unit for positioning one cooling plate and the other cooling plate is provided to a fin side surface of at least the one cooling plate of the cooling member.

8. The AC generator according to claim 7, wherein the cooling plate constituting the cooling member is formed by integrally molding the base portion and the fins with an aluminum member.

* * * * *